R. DOLLINGER & G. BISCHOFF.
MACHINE FOR MANUFACTURING METAL RING FABRICS.
APPLICATION FILED MAR. 23, 1910.

994,987.

Patented June 13, 1911.
6 SHEETS—SHEET 1.

R. DOLLINGER & G. BISCHOFF.
MACHINE FOR MANUFACTURING METAL RING FABRICS.
APPLICATION FILED MAR. 23, 1910.

994,987.

Patented June 13, 1911.

6 SHEETS—SHEET 2.

Witnesses.
Kenneth Romanes
Frank Linowy

Inventors.
Richard Dollinger & Gottlieb Bischoff
by Louis D. Schilling
their attorney R. DOLLINGER & G. BISCHOFF.
MACHINE FOR MANUFACTURING METAL RING FABRICS.
APPLICATION FILED MAR. 23, 1910.

994,987.

Patented June 13, 1911.

6 SHEETS—SHEET 3.

Witnesses.

Inventors.
Richard Dollinger, Gottlieb Bischoff
by
their attorney

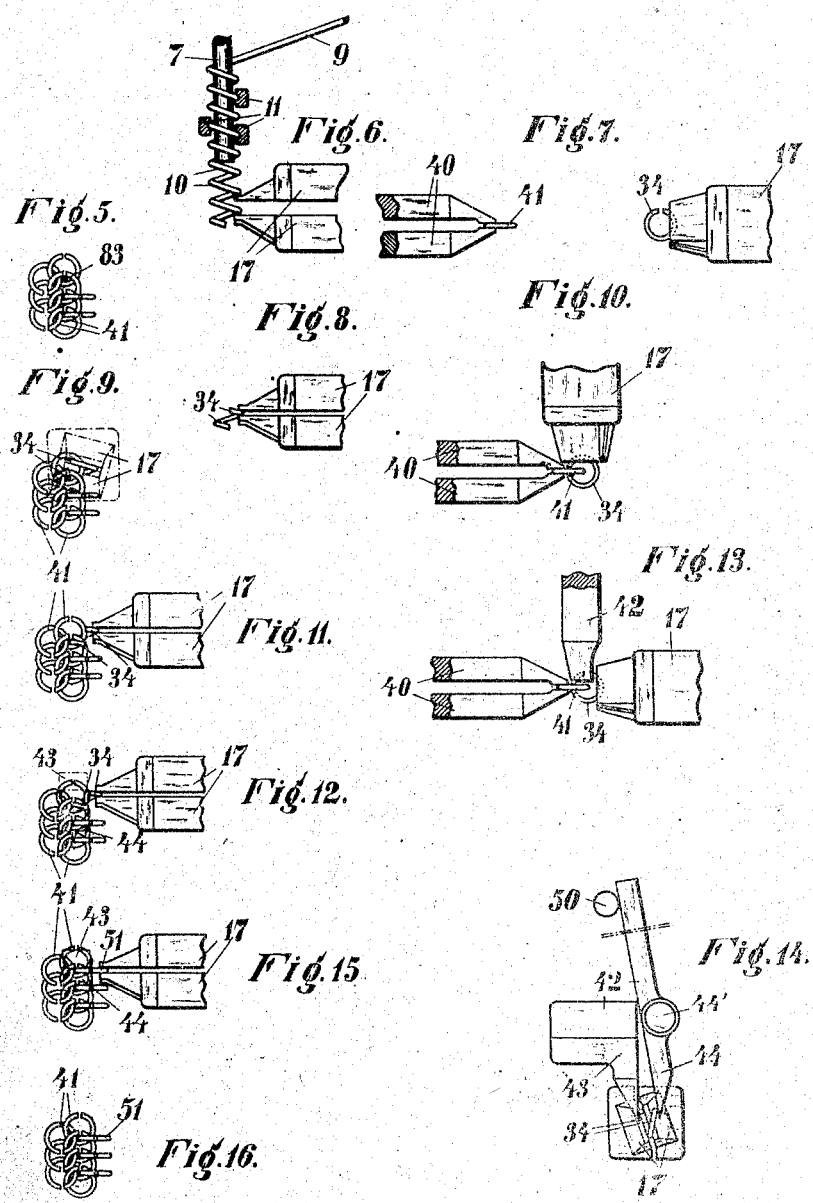

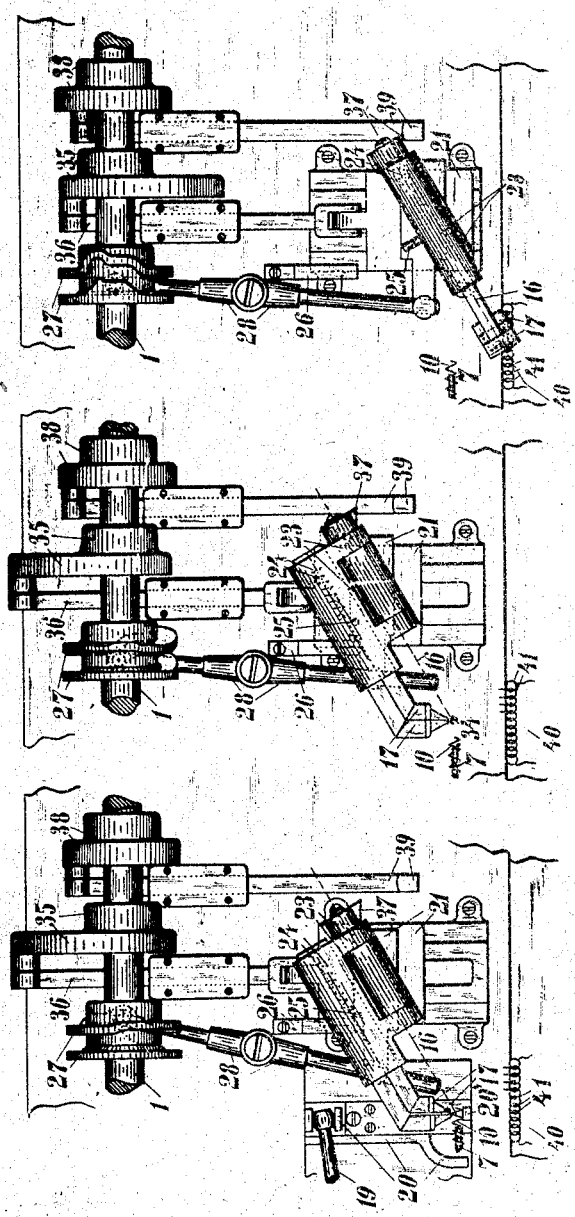

UNITED STATES PATENT OFFICE.

RICHARD DOLLINGER AND GOTTHILF BISCHOFF, OF PFORZHEIM, GERMANY, ASSIGNORS TO THE FIRM OF ERNST GIDEON BEK, OF PFORZHEIM, GERMANY.

MACHINE FOR MANUFACTURING METAL RING FABRICS.

994,987. Specification of Letters Patent. Patented June 13, 1911.

Application filed March 23, 1910. Serial No. 551,224.

*To all whom it may concern:*

Be it known that we, RICHARD DOLLINGER and GOTTHILF BISCHOFF, both subjects of the German Emperor, and both residing at Pforzheim, Baden, German Empire, have invented certain new and useful Improvements in Machines for Manufacturing Metal Ring Fabrics, of which the following is a specification.

The present invention relates to a machine for manufacturing metal ring-fabrics.

According to this invention a strip of fabric consisting of a few rows of metal rings is suitably stretched or held in such manner that the last longitudinal row of rings is readily accessible. To this row further links consisting of open rings are brought up, each one in succession being hooked through the space or opening presented by two of the overlapping closed rings, whereupon the open ring is turned through a certain angle and shut upon the said closed rings.

The fabric is built up in the following manner:—From a wire spiral the first turn is seized by a pair of pincers and, after being cut off by a suitable tool, is turned on its center and moved toward the strip of finished fabric in such manner that the joint or place of cut of the severed turn arrives in the plane of the fabric. In this position the link will take over the opening between the two overlapping closed rings of the fabric from below and above at the place where it is to be hooked through, the said opening first having been enlarged by means of a widening tool. Hereupon the open ring, still held by the pincers, is turned once again on its center, in such manner that its one end protrudes through the previously enlarged opening, whereupon it is bent flat, that is closed, by a specially constructed pair of pliers.

The operation of the machine is entirely automatic.

In order to make the invention more readily understood it will now be fully described with reference to the accompanying drawings, in which—

Figure 1:
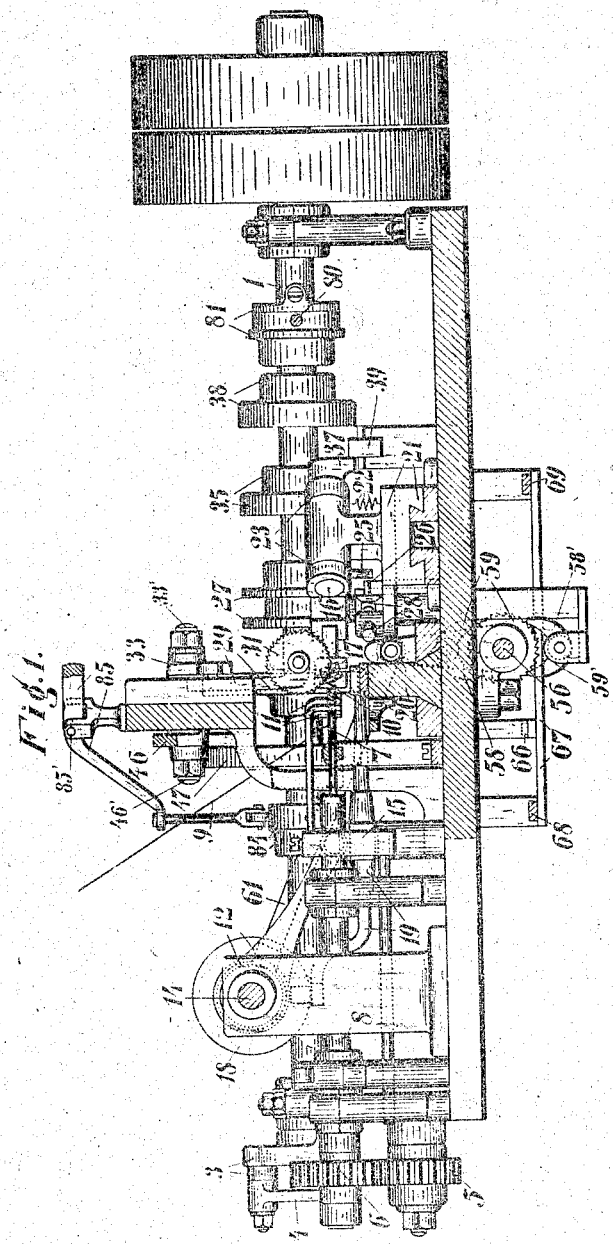
Figure 2:
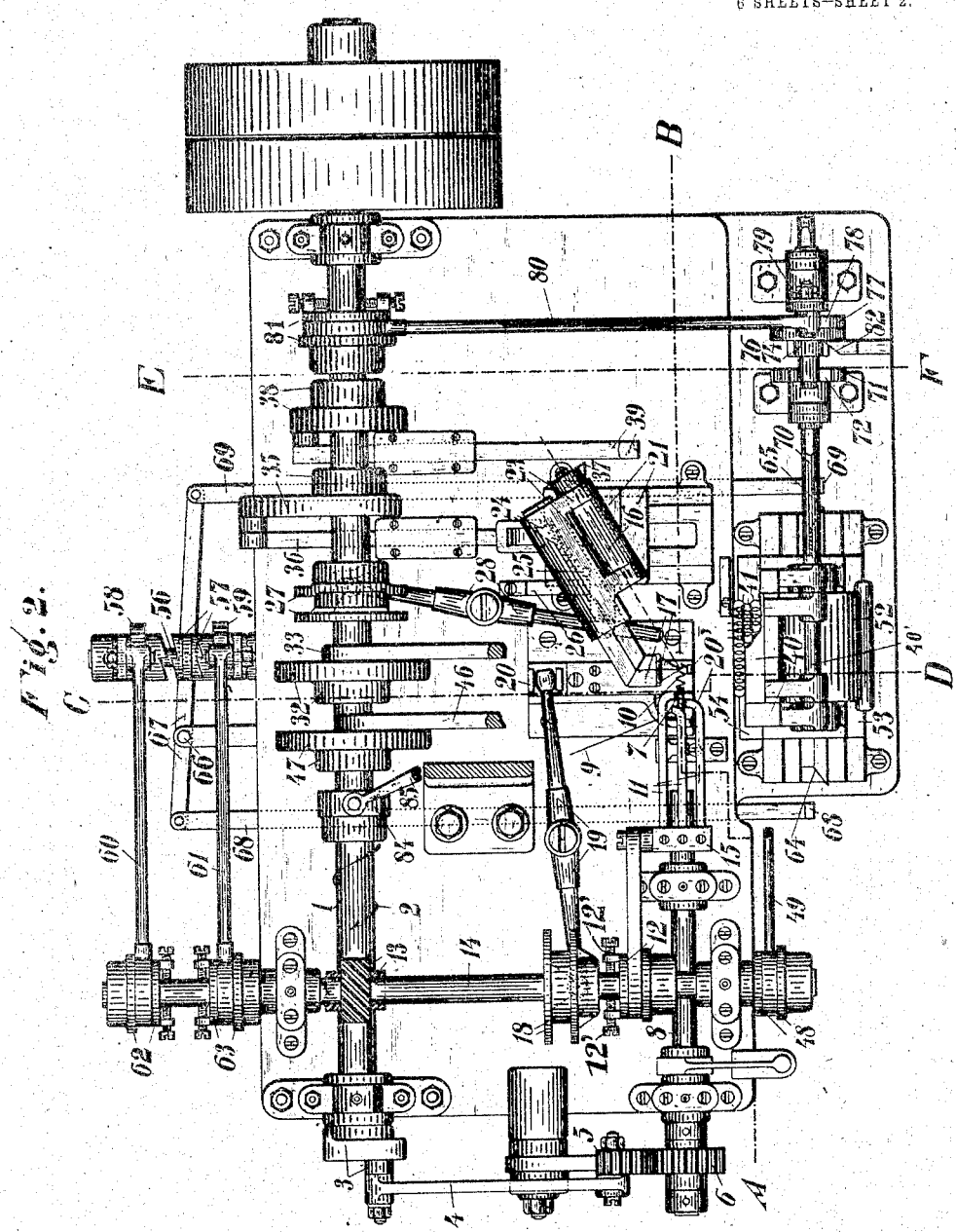
Figure 3:
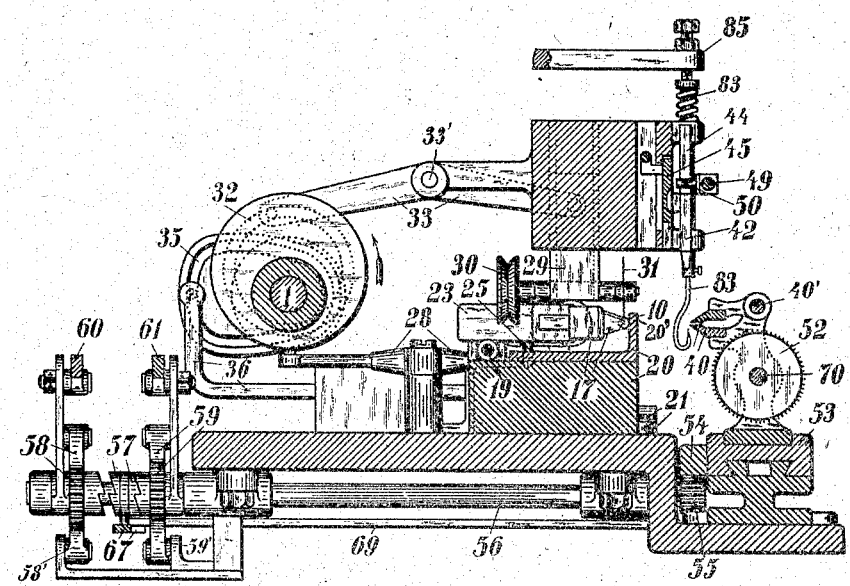
Figure 20:
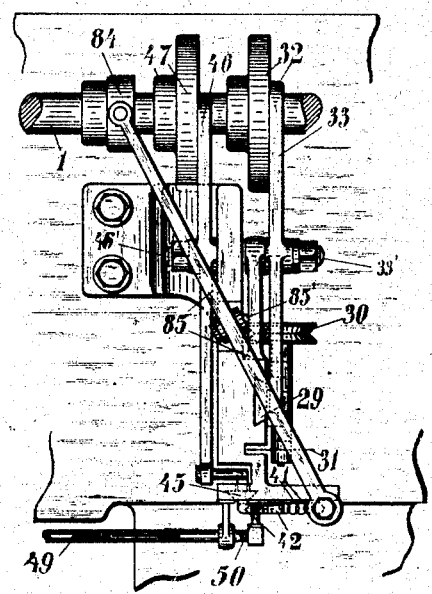
Figure 23:
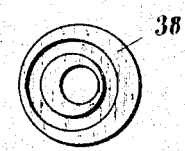
Figure 24:
Figure 25:
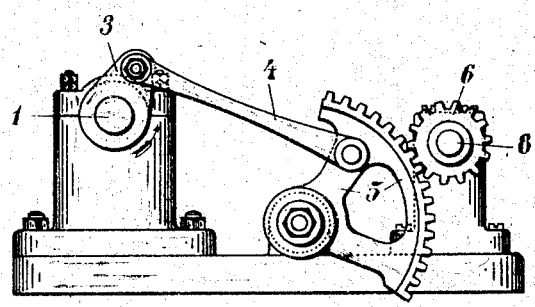

Figure 1 shows a front elevation of the machine, partly in section on line A—B of Fig. 2. Fig. 2 shows a plan of the machine, certain upper parts being removed in order to display the underlying mechanisms. Fig. 3 shows a cross-section on line C—D, and Fig. 4 a cross-section on line E—F of Fig. 2. Figs. 5-16 show, on an enlarged scale, the different positions of a ring member and the mechanisms necessary for handling it from the initial seizing to the final closing position. Figs. 17, 18 and 19 show the transverse slide with its pincers and accessories in different operating positions. Fig. 20 shows a plan of part of the upper structure with the mechanisms for actuating the saw for cutting-off the rings, the closing pliers and the widener. Figs. 21-24 show side elevations of grooved and eccentric disks fast on the main driving shaft. Fig. 25 shows the means for rotating the spindle for forming the wire spiral.

The main shaft 1 rotates in the direction of the arrow 2 (Fig. 2) and causes by means of its end crank 3 (Figs. 1, 2 and 25), crank rod 4 and toothed segment 5 a rocking motion of the toothed wheel 6. This latter is mounted on and connected with a spindle 8, provided with a removable mandrel 7, by means of a ratchet device, acting in one direction only and covered-in. In this manner, while the shaft 1 makes a half revolution, the spindle 8 with its mandrel executes a complete revolution and then remains at rest during the second half rotation of the shaft 1. Owing to the revolution of the spindle the wire 9 (Figs. 1, 2 and 6) for the formation of the rings, unreeling from a supply roller, is helically coiled upon the mandrel, turn by turn. The pitch of the wire spiral 10 can be regulated, as desired, by means of relatively adjustable guide arms 11. In the drawings, for the sake of clearness, a wire spiral is shown with exaggerated pitch. The guide arms 11 are secured to a holder 15, slidably mounted on the spindle and actuated by an eccentric 12 of the shaft 14 which is driven off the main shaft 1 by worm gearing 13. By means of the eccentric 12, whose eccentricity is adjustable by means of the screws 12′, the holder 15 with its guide arms 11 and thus the wire spiral are intermittently advanced so that the first wire turn comes opposite a pair of pincers 17, which latter turn on the axis 16 (shown in dotted lines in Figs. 1, 2, 17, 18, 19). Hereupon a grooved disk 18 on the shaft 14 comes into operation and by oscillating a double-armed lever 19 actuates a slide 20 in such manner that the latter with its up-standing ledge 20′ (Figs. 2, 3, 17) bends the wire spiral toward the pincers so that the first turn arrives within the domain of the jaws of the pincers 17 (Figs. 6 and 17). The pincers are mounted on a transverse slide 21 by means of the holder 23, turning about the axis 16, and are held in the horizontal position (Figs. 1, 2, 17, 18) by means of a spring 22 (Fig. 1), unless acted upon by superior forces. This transverse slide admits of a fourfold movement, toward either side, forward and backward.

Figure 21:
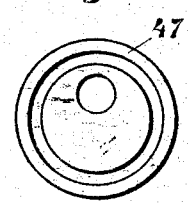
Figure 22:
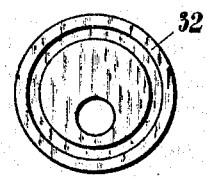

The pincers 17 are formed by two jaws, mounted in a holder 23, one jaw being rigid (the left one in Figs. 2, 17, 18, 19) and the other slidable. The latter is influenced by a spring 24 which has the tendency to close the pincers, and by a pin 25 secured on the slidable jaw and projecting downwardly through a slot in the holder 23, which contacts with a stop 26 for the purpose of opening the pincers upon the latter being shifted from right to left. For the purpose of closing the pincers they are shifted from left to right by a double-armed lever 28 which is turned by a grooved disk 27 on the main shaft 1, and which engages the slide 21. In this manner the pin 25 is released and the movable jaw pressed against the stationary jaw, whereby the first turn of the wire spiral is firmly gripped. During this seizure a circular saw 31, mounted on a slide 29 (Figs. 1, 3, 20) and driven by a grooved pulley 30, is let down by the rotary motion of an eccentric 32 on the main shaft with the aid of the double-armed lever 33 pivoted at 33′, and cuts off the first turn from the wire spiral. Naturally this cutting operation might be equally well performed by means of a knife, nippers or other tools. The severed link, held by the pincers 17 (Figs. 7 and 8), owing to the coöperation of the grooved disk 27 with the lever 28 and of the grooved disk 35 with the rod 36 which engages the slide 21, is now by the latter first moved from the left to the right and then forward. By the lateral movement, which is merely for the purpose of avoiding other parts, the pincer holder 23 with its nose 37 comes within the domain of a slidable catch 39 actuated by the grooved disk 38. On the advance of the holder 23 from the position shown in Fig. 18 to that shown in Fig. 19, its nose 37 strikes the meeting catch 39 with the result that the holder is turned upward about the axis 16. The angle of rotation is 90 degrees, the link 34, whose center lies in the imaginary extension of the axis 16, partaking of this rotation. The cut or joint of the link 34 will thus be brought from the upper position into the lateral horizontal position. In this latter position the link, which is still spirally directed and is open in front, can now be so moved forward toward the already finished fabric 41, held by a pair of broad pliers 40, that the link ends take over this fabric from below and above between two partly contracted or over-lapping rings. By turning back the pincers about the axis 16 from the vertical position (Fig. 11) into the horizontal position (Fig. 13) the link 34 turns correspondingly about its center back into its original position, with the joint upwardly, and in so doing will turn through the two overlapping rings, hooking into them, so to say. The turning back of the pincers from the vertical into the horizontal position is caused by the sliding catch 39 releasing the nose 37 of the holder 23, so that now the spring 22 can lay-over the holder. The next step is the closing of the hooked-in, but still open link 34 by a pair of pincers 42 (Figs. 13 and 14). The latter are constructed with a vertically displaceable jaw 43 (Figs. 12, 14 and 15) and a jaw 44 which slides with the other and is pivoted at 44′. The vertical displacement of the pincers 42 is effected by means of an eccentric 47 on the main driving shaft, which acts on the lever 46, pivoted at 46′, which in turn actuates the slide 45 (Figs. 20 and 21).

On descent from the position of Fig. 3 the pincers 42 are open, and the position shown in Figs. 14, 13 and 12 is that in which the ring 34 is seized by the jaws of the closing pincers. By closing these pincers by means of the rod 49 with follower 50 (Figs. 3, 14 and 20), actuated by the eccentric 48 of shaft 14 and operating the leg of the rotatable pincer jaw 44, the link 34 is closed flat, that is it is bent together or flattened to form a closed ring 51 (Figs. 15 and 16). The now finished ring is released by the pincers 42 and 17, which return to their initial position owing to the action of the grooved disks 47, 27 and 35. Simultaneously the fabric, held in the pliers 40, must be advanced the width of a row of rings in order that the next link to be brought up by the pincers 17 may in the course of operation be passed through the next opening between the overlapping rings, as above described. This feed of the fabric is effected by shifting the slide 53, which carries a pin drum 52 (Figs. 2 and 3) and the pliers 40, in the direction of the drum axis. For this purpose the toothed wheel 55 on a shaft 56 engages with the rack 54 of the slide 53 (Fig. 3), which shaft 56 carries at its end two ratchet devices 58, 59 which can be connected with it alternately by means of a reversing device. The ratchet devices 58, 59 consist each of a ratchet wheel and a corresponding pawl. These ratchet wheels and the arms carrying the pawls and actuated by the eccentric rods 60, 61 ride loosely on the shaft 56, but are prevented from sliding longitudinally thereof. As shown in Fig. 1, the clicks 58′ and 59′ engage the ratchet wheels from below, pivoting on rigid pins, with the result that during each revolution of the shaft 14 the ratchet wheels are advanced the distance of one ratchet tooth. The eccentrics 62, 63 for the rods 60, 61 are adjustable as to their eccentricity on the shaft 14. The ratchet wheels are so pitched that the one, during the step feed, turns in the direction of the clock hands and the other in the opposite direction, the clicks 58', 59' preventing a turning back of these wheels during the back throw of the ratchet pawls. On the shaft 56 between the ratchet wheels there is slidingly arranged the clutch member 57 (Figs. 2 and 3) which can be alternately coupled with the correspondingly recessed hubs of the ratchet wheels by means of the double-armed lever 67 which swings about the pin 66 and is pivotally connected to the clutch part 57. Accordingly, the shaft 56 will be intermittently rotated in the one or the other direction, depending upon with which ratchet device the clutch is coupled at the time. The fabric slide 53, into whose rack 54 the driver 55 of the shaft 56 cogs, is then correspondingly advanced in the one or the other direction, and each advance movement corresponds to the width of a row of rings of the fabric. Upon one row being finished the clutch 57 must be shifted so that the fabric is then fed in the opposite direction. This reversal of feed is caused by the inclined planes 64, 65 of the slide 53 at the end of its travel in either direction, alternately coöperating with the free ends of the rods 68, 69 which with their other ends are pivotally secured to the respective ends of the swing lever 67, which latter, as above described, is pivotally secured to the clutch part 57. Every time the direction of feed of the fabric is reversed, it must be drawn into the pliers 40 through the space of one row of rings, in order that the links for formation of the new row may be hooked in, and this is effected by intermittent rotation of the pin drum 52 in clockwise direction.

For readily drawing-in the finished fabric into the pliers 40 and yet holding it securely during the work operations, the upper one of the two plier jaws, pivoted at 40', is yieldingly pressed upon the fabric resting on the lower, rigid jaw by a spring or the like, not shown.

Figure 4:
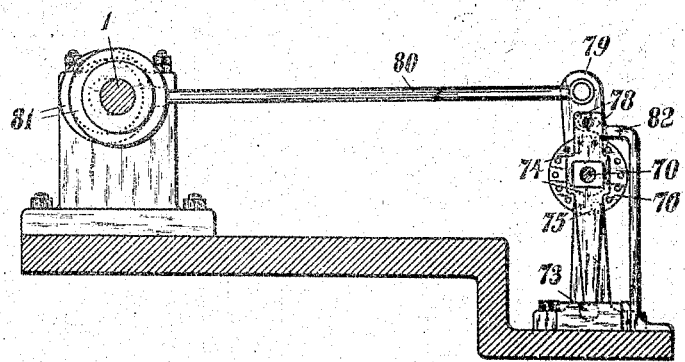

For the purpose of rotating the pin drum there is provided a ratchet wheel 71 (Fig. 2), fixed on the drum shaft 70, and with which there engages the pawl 72 of a lever 74 journaled with its ball-shaped lower end in a socket bearing 73. The lever 74 ordinarily is held in the position shown in Figs. 2 and 4 by any suitable means, for instance a spring, but owing to its ball and socket bearing it can be tilted over laterally as well as toward the pin drum, and it lies within the domain of the pin 75 of a disk 76 secured to a ratchet wheel 77 which is loosely mounted on the drum shaft 70. This ratchet wheel 77, at each rotation of the main driving shaft, is advanced the distance of one tooth by an arm 79 furnished with a pawl 78, to which arm is linked the rod 80 of an eccentric 81 on the main shaft (Fig. 4). Since the pin 75 partakes of the rotation of the ratchet wheel 77, it will, at a predetermined period, coinciding with the reversal of the feed of the slide 53, strike against the lever 74 and take it along. By this tilting movement, however, the ratchet wheel 71 on the drum shaft 70 will be also advanced through a certain angle by means of the pawl 72 which is pivoted to the lever 74 (Fig. 2). The drum 52 likewise partakes of this movement and draws back the fabric through the width of one longitudinal row of rings into the pliers 40. The angle of rotation of the pin drum depends upon the size of the fabric rings and is partly determined by the incline 82 with which the lever 74 coöperates during the feed operation, whereby the lever is shifted toward the pin drum and out of the domain of pin 75. The rotation of the ratchet wheel 71 thus takes place during the feed motion of the pin 75, commencing with the latter striking the lever 74 and terminating with this latter lever ascending the incline 82. Upon the lever 74 being freed again it returns into its initial position (Figs. 2 and 4), and with it the pawl 72. The number of teeth on the ratchet wheel 71 is such that the finished fabric at each feed motion is drawn into the pliers 40 the width of a row of rings. The number of teeth on the ratchet wheel 77 must correspond to the number of individual rings in each row, if the operation is to be entirely automatic. If the number of such rings is altered the ratchet wheel 77 must also be exchanged for another, or the pin 75 must be set back or ahead in the disk 76, after the pin drum has been fed forward the required distance. The holes in the disk for adjustably inserting the pin 75 are circularly arranged, as shown in Fig. 4.

Before the individual rings are hooked-in by the pincers 17 a widener 83 (Figs. 3 and 5) is caused to ascend or descend into the fabric in such manner that the place at which the still open link is to be hooked through, that is to say the space between two overlapping rings, is enlarged. The up and down movement of the widener 83 is produced by means of lever 85, actuated by an eccentric 84 (Figs. 20 and 24) and rotatable about the horizontal axis 85' (Figs. 1 and 20).

The operation of the machine is as follows:—After the wire 9 has been coiled about the mandrel 7 by the operation of the devices 3, 4, 5, 6, and 8 driven from the main shaft 1, the guide arms 11, which take around the thus formed wire spiral 10, are shifted by the eccentric 12 of shaft 14, whereby the first turn of the spiral advances opposite the open pincers 17 (Figs. 6 and 17). Hereupon, by the return of the slide 20, which is caused by the operation of the double-armed lever 19 actuated by the grooved disk 18, the turn of the spiral is brought between the jaws of the pincers 17 and the latter closed. This closing movement occurs on the pincers moving from the left end position (Figs. 6, 17) into the intermediate position (Figs. 2, 8), and is produced by the double-armed lever 28 which causes a lateral displacement of the transverse pincer slide 21. This movement is responsible for the simultaneous shifting of the exterior jaw of the pincers, while the other jaw, under the influence of the spring 24, with its pin 25 rests against the stop 26, until the intended closure of the pincers has taken place, when the turn of the spiral is clamped. The circular saw 31 is simultaneously let down by the lever 33, pivoted at 33', and severs the first turn 34 of the wire spiral. The severed link held by the pincers 17 is now advanced toward the ring fabric 41 held in the pliers 40, moving first from the left to the right, that is from the position of Fig. 2 into that of Fig. 18, and then forward toward the fabric. For effecting this composite movement the pincers are first shifted by the oscillating lever 28 toward the right, and next by the eccentric rod 36 toward the front (Fig. 19). During this latter movement the pincers are rotated about the prolongation of the axis 16 through the center of the link 34 from the horizontal (Figs. 7, 18) to the vertical position (Fig. 10, 19), whereby the joint of the link is brought into horizontal position, and thus into the plane of the fabric. Prior to the arrival of the pincers in the front position (Fig. 19) the widener 83 has to bring into the proper position and to enlarge the opening between those fabric rings through which the new link is to be passed. When the link has been carried over the fabric, as shown in Figs. 9, 10, 19, so that its one end comes below the opening in question, the pincers 17 are turned back again about the axis 16 into the horizontal position (Fig. 13) by the catch 39 releasing the pincers and by the action of the spring 22. The link partakes of this movement and its lower end winds into the opening previously enlarged by the widener 83, in such manner that the joint again comes uppermost (Fig. 11). The next step comprises the closing of the still open link to constitute a closed ring. This is effected by means of the pincers 42, which for this purpose are moved downward and their jaws 43, 44 then closed upon the link (Fig. 15). The now closed, flat link, designated by 51 in Fig. 15, is now finished, and the described operations are repeated for the next ring formation. The pincers 42, 17 now release the ring and return to their initial position, while the slide 53 with the fabric carrying drum 52 is shifted through one division by one of the eccentrics 62, 63, depending upon the prevailing direction of feed. The shifting of the slide 53 is caused by the eccentric rods 60, 61 (Figs. 1, 2, 3) advancing the shaft 56 step by step through the width of a ratchet tooth by the aid of the ratchet devices 58, 59, one of which is always in engagement with the shaft 56 by means of the clutch coupling 57. The driver 55 of shaft 56 meshing with the rack 54 on the slide 53, the latter is laterally shifted.

When the row of rings (which in the drawings is only partly finished) is complete the fabric is drawn back through one division into the pliers 40 by rotation of the pin drum, which movement is produced by the parts 80, 79, 78, 77, 76, 75, 82, 74, 72, 71. The eccentric rod 80, upon rotation of the main shaft 1, has caused such a stepping-ahead of the ratchet wheel 77 by means of the pawl 78 that the adjustable pin 75 in the disk 76, by contacting with the lever 74, causes the latter's pawl 72 to rotate the ratchet wheel 71 and with it the drum shaft 70. During the last shifting movement of the slide at the completion of a row of rings one of the inclined planes 64, 65 contacts with the respective rod 68 or 69 and causes thereby an oscillation of the lever 67 about its pivot 66 whereby the clutch is shifted and the rotation of the shaft 56 reversed. The ensuing feed movements of the slide 53 with its fabric carrying pliers, obviously, will be in the opposite direction to the prior ones.

All of the described operations, from the beginning of the formation to the closing of each link, take place during each full revolution of the main shaft, while the drawing-in of the fabric into the pliers 40 and the reversal of the direction of travel of slide 53 take place only at the completion of each row of rings.

We claim as our invention:

1. In a machine for manufacturing metal fabrics, the combination of wire-coiling mechanism; gripping means for engaging the first coil of the wire; a vertically-movable cutting member for severing said coil from said wire; means for operating said member; mechanism for supporting a finished strip of fabric; mechanism for linking the severed coil of wire into said strip; and mechanism for forming the said coil into a closed ring.

2. In a machine for manufacturing metal fabrics, the combination of wire-coiling mechanism; gripping means for engaging the first coil of the wire; a vertically-movable cutting member for severing said coil from said wire; separate means for rasing and lowering and for rotating said member; mechanism for supporting a finished strip of fabric; mechanism for linking the severed coil of wire into said strip; and mechanism for forming the said coil into a closed ring.

3. In a machine for manufacturing metal fabrics, the combination of wire-coiling mechanism; a slide provided with a plurality of relatively adjustable arms engaged with the wire for regulating the pitch of the coil; a gripper arranged to engage the first coil of the wire; mechanism for reciprocating said slide, to periodically advance said wire toward said gripper; means for operating said gripper; and mechanism for severing the said first coil from said wire while engaged by said gripper.

4. In a machine for manufacturing metal fabrics, the combination of wire-coiling mechanism; means associated therewith for controlling the pitch of the coil; a gripper arranged to engage the first coil of the wire; means for periodically advancing the coiled wire toward the gripper; means for bending said first coil bodily toward said gripper; means for operating said gripper; and mechanism for severing the said first coil from said wire while engaged by said gripper.

5. In a machine for manufacturing metal fabrics; the combination of wire-coiling mechanism; a gripper arranged to engage the first coil of the wire; a slide upon which said gripper is mounted, provided with a lug arranged to engage said first coil for bending the same toward said gripper; means for operating said slide; and means for severing said first coil while engaged by said gripper.

6. In a machine for manufacturing metal fabrics, the combination of wire-coiling mechanism; a gripper for engaging the first coil of the wire comprising fixed and movable jaws; and mechanism for opening and closing the gripper comprising a spring connected to the slidable jaw for normally holding the same in one position, a pin provided upon said jaw, a stop arranged in the path of said pin, and means for shifting said gripper bodily toward said stop to bring said pin into contact therewith, for moving said jaw into the other position against the action of said spring.

7. In a machine for manufacturing metal fabrics, the combination of wire-coiling mechanism; a gripper for engaging the first coil of the wire; means for operating said gripper; a slide on which said gripper is mounted; and separate mechanism for imparting endwise and lateral reciprocatory movements to said slide.

8. In a machine for manufacturing metal fabrics, the combination of wire-coiling mechanism; a gripper arranged to engage the first coil of the wire; means for operating the gripper; means for severing said first coil from the wire while engaged by said gripper; means for supporting a finished strip of fabric; means for rocking said gripper upon its axis toward said strip to link the severed coil of wire therewith; means for subsequently rocking said gripper away from said strip; and means for finally closing together the ends of said severed coil.

9. In a machine for manufacturing metal fabrics, the combination of wire-coiling mechanism; a gripper arranged to engage the first coil of the wire; means for severing said coil from said wire while engaged by said gripper; mechanism for supporting a finished strip of fabric; mechanism associated with said gripper for linking the severed coil into said strip; and means for subsequently closing together the ends of said severed coil.

10. In a machine for manufacturing metal fabrics, the combination of wire-coiling mechanism; a gripper arranged to engage the first coil of the wire; means for severing said coil from said wire while engaged by said gripper; mechanism for supporting a finished strip of fabric; mechanism associated with said gripper for linking the severed coil into said strip; and a vertically-movable gripper for subsequently closing together the ends of said severed coil.

11. In a machine for manufacturing metal fabrics, the combination of wire-coiling mechanism; a gripper arranged to engage the first coil of the wire; means for severing said coil from said wire while engaged by said gripper; mechanism for supporting a finished strip of fabric; mechanism associated with said gripper for linking the severed coil into said strip; a vertically-movable gripper for closing together the ends of said severed coil comprising fixed and movable jaws; means for opening and closing said jaws; and means for raising and lowering said gripper.

12. In a machine for manufacturing metal fabrics, the combination of wire-coiling mechanism; a gripper arranged to engage the first coil of the wire; means for severing said coil while engaged by said gripper; means for supporting a finished strip of fabric; mechanism for rocking said gripper toward said strip to link said coil thereinto; a vertically movable gripper; means for moving the second-named gripper in one direction to engage said linked coil and close the ends thereof together; and separate means for returning the first- and second-named grippers to their initial positions.

13. In a machine for manufacturing metal fabrics, the combination of ring-forming mechanism; mechanism for supporting a finished strip of fabric; mechanism for linking the rings to said strip in rows; a rotary member engaged with said strip; and means for rotating said member in one direction after the formation of a row has been completed, to move said strip into position for the attachment of a fresh row of rings thereto.

14. In a machine for manufacturing metal fabrics, the combination of ring-forming mechanism; mechanism for supporting a finished strip of fabric; mechanism for linking the rings successively to said strip to form a row; mechanism for shifting said strip laterally after the attachment of each ring thereto; and mechanism for moving said strip endwise after the formation of a row has been completed.

15. In a machine for manufacturing metal fabrics, the combination of ring-forming mechanism; mechanism for supporting a finished strip of fabric; mechanism for linking the rings successively to said strip to form a row; mechanism for shifting said strip laterally after the attachment of each ring thereto; a rotary member engaged with said strip; and means for rotating said member in one direction after the formation of a row has been completed, to move said strip into position for the attachment of a fresh row of rings thereto.

16. In a machine for manufacturing metal fabrics, the combination of ring-forming mechanism; a member for supporting a finished strip of fabric; a slide whereon said member is mounted; mechanism for linking the rings successively to said strip; means for imparting a feed movement in one direction to said slide after the attachment of a ring thereto; and, means for automatically reversing the direction of feed after the attachment of a predetermined number of rings.

17. In a machine for manufacturing metal fabrics, the combination of ring-forming mechanism; a support for a finished strip of fabric; mechanism for linking the rings successively to said strip; mechanism for imparting a step-by-step feed movement to said support; and mechanism for periodically reversing the direction of such movement.

18. In a machine for manufacturing metal fabrics, the combination of ring-forming mechanism; a support for a finished strip of fabric; a slide whereon said support is mounted; mechanism for successively linking the rings to said strip; a shaft; connections between said shaft and slide for imparting a feed movement to the latter; a pair of driving members mounted on said shaft; means for operating said driving members; a driven member mounted on said shaft; and means operated by said slide for shifting said driven member into alternate engagement with said driving members to periodically reverse the direction of rotation of said shaft.

19. In a machine for manufacturing metal fabrics, the combination of ring-forming mechanism; a support for a finished strip of fabric; a slide whereon said support is mounted provided with a rack; a shaft provided with a pair of loose clutch members and with a pinion meshing with said rack; means for driving said clutch members; a fast clutch member slidable on said shaft and arranged to alternately engage said loose members; a shifting lever connected with said fast clutch member for effecting such engagement; a pair of members pivoted to the ends of said lever, and arranged upon opposite sides of said slide; and means provided upon said slide for engaging said members alternately to periodically operate said lever and reverse the direction of rotation of said shaft.

20. In a machine for manufacturing metal fabrics, the combination of ring-forming mechanism; a support for a finished strip of fabric; a slide whereon said support is mounted; mechanism for successively linking the rings to said strip; means for imparting a step-by-step lateral feed movement to said support, to effect the attachment of said rings in rows; means for automatically reversing the direction of such movement when the formation of a row has been completed; and means for drawing the fabric longitudinally in one direction after each row has been formed.

21. In a machine for manufacturing metal fabrics, the combination of ring-forming mechanism; means for supporting a finished strip of fabric; mechanism for linking a ring into the space between a pair of overlapping rings comprised in said strip; and means for widening such space prior to the attachment of the first-named ring.

22. In a machine for manufacturing metal fabrics, the combination of ring-forming mechanism; means for supporting a finished strip of fabric; mechanism for linking a ring into the space between a pair of overlapping rings comprised in said strip; and a vertically-movable member for widening such space prior to the attachment of the first-named ring.

23. In a machine for manufacturing metal fabrics, the combination of wire-coiling means; means for severing the successive coils of the wire; means for linking each coil into the space between a pair of overlapping rings comprised in said strip; means for widening such space prior to the attachment of a coil; and means for subsequently closing the ends of a coil together.

24. In a machine for manufacturing metal fabrics, the combination of wire-coiling means; means for severing the successive coils of the wire; a gripper for linking each coil into the space between a pair of overlapping rings comprised in said strip; means for widening such space prior to the attachment of a coil; and a gripper for subsequently closing the ends of a coil together.

In testimony whereof we affix our signatures in presence of two witnesses.

RICHARD DOLLINGER.
GOTTHILF BISCHOFF.

Witnesses:
JOSEPH ROHMER,
AUGUST OOSTERMAN.